No. 822,528. PATENTED JUNE 5, 1906.
F. M. LEAF.
POT STIRRER.
APPLICATION FILED FEB. 4, 1905.
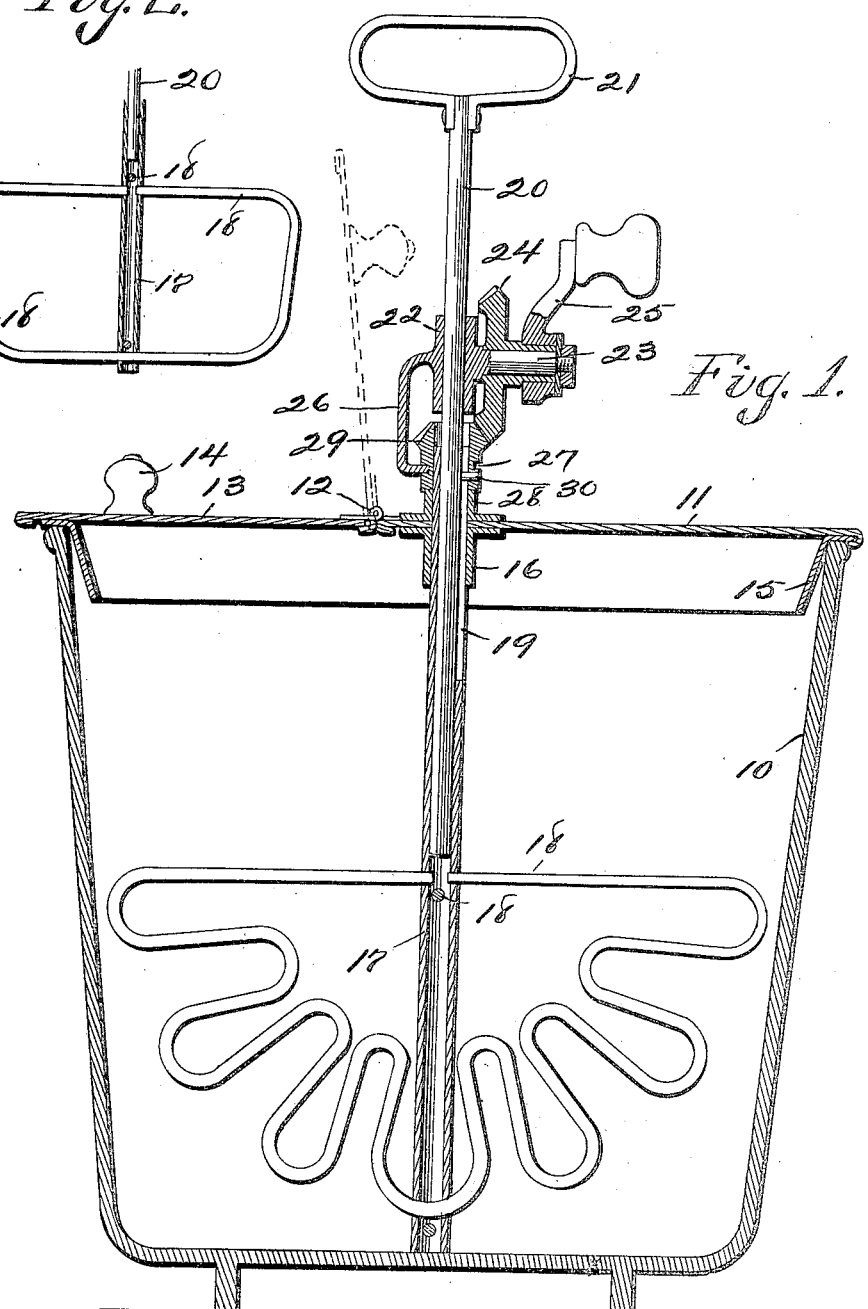

UNITED STATES PATENT OFFICE.

FLORENCE M. LEAF, OF PERRY, IOWA.

POT-STIRRER.

No. 822,528.

Specification of Letters Patent.

Patented June 5, 1906.

Application filed February 4, 1905. Serial No. 244,108.

*To all whom it may concern:*

Be it known that I, FLORENCE M. LEAF, a citizen of the United States, residing at Perry, in the county of Dallas and State of Iowa, have invented a certain new and useful Pot-Stirrer, of which the following is a specification.

The object of my invention is to provide a pot-stirrer of simple, durable, and inexpensive construction, comprising a cover designed to rest upon and be supported by a pot and in turn detachably and adjustably supporting the stirring device to thereby provide a device of this kind adapted to be used in connection with pots of various sizes and shapes.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a vertical sectional view of my improvement applied to a cover and shown in a pot as required for use. The dotted lines show the hinged portion of the cover in an elevated position; and Fig. 2 shows a vertical sectional view of the tube and stirring-arms on a line at right angles to Fig. 1.

Referring to the accompanying drawings, I have used the reference-numeral 10 to indicate the pot. It is not necessary to use a pot of any particular size or shape, as my invention is designed to be used in connection with pots of various sizes and shapes. The cover for the pot comprises a stationary cover member 11, connected with which by the hinge 12 is the movable cover member 13, formed with a handle 14, the two cover members in their closed positions forming a top for the pot. I have provided for forming a tight joint between the cover and the pot by means of an inwardly-tapered flange or rim 15, fixed to the under surface of the part 11 and extending around under the hinged cover member 13, thus forming a complete circle and yet not interfering with the opening and closing of the hinged member. Within given limits the tapered flange or rim 15 will fit tightly into pots of different diameters. Connected with the central portion of the cover 11 is the vertical sleeve 16, designed to receive the stirring device.

The stirring device comprises a lower member and an upper member detachably connected with each other and with the cover. The lower member is formed of a tube 17, having near its lower end the stirring-arms 18 and provided near its top with a vertical slot 19. Said tube is designed to pass through the sleeve 16 of the cover and project a slight distance above the cover.

The upper member comprises a rod 20, formed with a handle 21 at its top and having its lower end designed to enter the tube 17. Mounted upon the rod 20 is a hub 22, having a journal 23 fixed thereto, upon which the beveled pinion 24 is rotatably mounted. This hub fits the handle firmly enough to be elevated when the handle is raised. Fixed to the beveled pinion 24 is a crank 25, by which the pinion may be rotated. Formed on the hub 22 is an arm 26, extended downwardly and entering a groove 27, which groove is formed in a hub 28 of a small beveled gear-pinion 29, which is meshed with the pinion 24. In this way a rotation of the pinion 24 will drive the pinion 29 at an increased rate of speed, and the two pinions are held together, so that the operator may at any time grasp the handle 21 and elevate the rod 20 and the mechanism connected therewith out of engagement with the tubular shaft 17. The said hub 28 is designed to telescopically receive the upper end of the tube 17, and a pin 30 is fixed to the hub 28 and projected into the slot 19 of the tube 17, so that the tube 17 will be rotated in unison with the beveled pinion 29.

In practical use and assuming the parts to be arranged as shown in the drawings the operator may by turning the crank 25 rotate the stirring-arms 18 inside of the pot. Access may be had to the interior of the pot through the hinged cover member 13 without removing the operative mechanism. The lower end of the tube 17 will always rest upon the bottom of the pot in which it is placed, because the tube is slidingly mounted in the sleeve 16 of the cover. The entire cover and operative mechanism may be removed bodily from the pot, if desired, and the handle, with the gearing device, may at any time be easily detached from the stirring member and the stirring member may be easily detached from the cover for the purposes of cleaning, packing, or shipping said parts.

Having thus described my invention, what I claim, and desire to secure by Letters Patent of the United States therefor, is—

1. The combination of a pot lid or cover, a stirring member passed through the lid or cover and slidingly and detachably connected therewith, a handle member slidingly, detachably and rotatably mounted in the stirring member, a hub mounted on the handle member, and two gear-wheels supported by the hub in mesh with each other, one of them slidingly and non-rotatably connected with the stirring member.

2. The combination of a pot lid or cover, a sleeve passed through it, a tube passed through the sleeve and provided with a longitudinal slot at its upper end, stirring-arms fixed to the lower end of the tube, a handle inserted in the tube and slidingly connected therewith, a hub mounted on the handle, a beveled pinion rotatably supported by the hub, a crank connected therewith, a second beveled pinion rotatably supported by the hub in mesh with the first pinion, said hub provided with a pin inserted in the slot of the said tube to slidingly detachably and non-rotatably connect it with the tube.

FLORENCE M. LEAF.

Witnesses:
J. P. GILBERT,
THOS. J. GILBERT.